(12) United States Patent
Hirano et al.

(10) Patent No.: US 10,792,869 B2
(45) Date of Patent: Oct. 6, 2020

(54) PREFORM, FIBER-REINFORCED COMPOSITE MATERIAL, AND METHOD OF MANUFACTURING FIBER-REINFORCED COMPOSITE MATERIAL

(71) Applicant: Toray Industries, Inc., Tokyo (JP)

(72) Inventors: Masanori Hirano, Nagoya (JP); Kazunori Hondo, Nagoya (JP); Nobuyuki Tomioka, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 245 days.

(21) Appl. No.: 15/548,268

(22) PCT Filed: Feb. 2, 2016

(86) PCT No.: PCT/JP2016/053032
§ 371 (c)(1),
(2) Date: Aug. 2, 2017

(87) PCT Pub. No.: WO2016/125779
PCT Pub. Date: Aug. 11, 2016

(65) Prior Publication Data
US 2018/0264754 A1 Sep. 20, 2018

(30) Foreign Application Priority Data
Feb. 5, 2015 (JP) ................. 2015-021275

(51) Int. Cl.
*B29C 70/02* (2006.01)
*B32B 5/26* (2006.01)
*C08J 5/04* (2006.01)
*B32B 5/28* (2006.01)
*B32B 27/20* (2006.01)
*B32B 7/12* (2006.01)
*B32B 27/18* (2006.01)
*B32B 5/16* (2006.01)
*B32B 5/30* (2006.01)
*B32B 27/12* (2006.01)
*B32B 3/26* (2006.01)
*C08L 77/00* (2006.01)
*C08L 63/00* (2006.01)
*B32B 5/22* (2006.01)
*B32B 27/38* (2006.01)
*B32B 5/02* (2006.01)
(Continued)

(52) U.S. Cl.
CPC .......... *B29C 70/025* (2013.01); *B29C 70/443* (2013.01); *B32B 3/26* (2013.01); *B32B 5/02* (2013.01); *B32B 5/145* (2013.01); *B32B 5/16* (2013.01); *B32B 5/22* (2013.01); *B32B 5/26* (2013.01); *B32B 5/28* (2013.01); *B32B 5/30* (2013.01); *B32B 7/12* (2013.01); *B32B 27/12* (2013.01); *B32B 27/18* (2013.01); *B32B 27/20* (2013.01); *B32B 27/205* (2013.01); *B32B 27/38* (2013.01); *C08J 5/042* (2013.01); *C08L 63/00* (2013.01); *C08L 77/00* (2013.01); *B32B 2260/02* (2013.01); *B32B 2260/023* (2013.01); *B32B 2260/025* (2013.01); *B32B 2260/046* (2013.01); *B32B 2262/106* (2013.01); *B32B 2264/0214* (2013.01); *B32B 2264/0264* (2013.01); *B32B 2305/30* (2013.01); *B32B 2307/30* (2013.01); *B32B 2307/50* (2013.01); *B32B 2307/558* (2013.01); *B32B 2307/732* (2013.01); *B32B 2419/06* (2013.01); *B32B 2603/00* (2013.01); *B32B 2605/00* (2013.01); *B32B 2605/18* (2013.01); *C08J 2381/06* (2013.01); *C08J 2463/02* (2013.01)

(58) Field of Classification Search
CPC .......... C08L 63/00; C08L 77/00; C08L 29/04; C08L 81/06; B29C 70/025; B29C 70/443; B32B 2260/02; B32B 2260/023; B32B 2260/025; B32B 2260/046; B32B 2262/106; B32B 2264/0214; B32B 2264/0264; B32B 2305/30; B32B 2307/30; B32B 2307/50; B32B 2307/558; B32B 2307/732; B32B 2419/06; B32B 2603/00; B32B 2605/00; B32B 2605/18; B32B 27/12; B32B 27/18; B32B 27/20; B32B 27/205; B32B 27/38; B32B 3/26; B32B 5/02; B32B 5/145; B32B 5/16; B32B 5/22; B32B 5/26; B32B 5/28; B32B 5/30; B32B 7/12; C08J 2381/06; C08J 2463/02; C08J 5/042
See application file for complete search history.

(56) References Cited

U.S. PATENT DOCUMENTS

| | | | |
|---|---|---|---|
| 5,268,223 A | * | 12/1993 | Qureshi ............. C08G 59/3218 428/327 |
| 7,931,958 B2 | | 4/2011 | Arai et al. |
| 2012/0115388 A1 | | 5/2012 | Baidak et al. |

(Continued)

FOREIGN PATENT DOCUMENTS

| | | |
|---|---|---|
| JP | 2001-524171 A | 11/2001 |
| JP | 2005-194456 A | 7/2005 |

(Continued)

*Primary Examiner* — Arti Singh-Pandey
(74) *Attorney, Agent, or Firm* — DLA Piper LLP (US)

(57) ABSTRACT

A preform includes a plurality of reinforcement fiber layers connected to each other by binder resin, the binder resin containing spacer particles insoluble in the binder resin, the spacer particles accounting for a volume proportion of 10% to 80% in the binder resin present in interlaminar gaps between the reinforcement fiber layers.

15 Claims, No Drawings

(51) Int. Cl.
  *B32B 5/14* (2006.01)
  *B29C 70/44* (2006.01)

(56) References Cited

U.S. PATENT DOCUMENTS

2013/0330514 A1* 12/2013 Cawse ...................... B32B 5/26
                                                      428/143
2015/0344686 A1   12/2015 Shimizu et al.
2016/0107739 A1*  4/2016 Restuccia ............. B29C 70/885
                                                      428/114

FOREIGN PATENT DOCUMENTS

| JP | 2010-510110 A | 4/2010 |
| JP | 2013-541629 A | 11/2013 |
| JP | 5655976 B1 | 12/2014 |
| WO | 2011/034040 A1 | 3/2011 |
| WO | 2014/007288 A1 | 1/2014 |

* cited by examiner

PREFORM, FIBER-REINFORCED COMPOSITE MATERIAL, AND METHOD OF MANUFACTURING FIBER-REINFORCED COMPOSITE MATERIAL

TECHNICAL FIELD

This disclosure relates to a preform of reinforcement fiber and fiber reinforced composite material.

BACKGROUND

Fiber reinforced composite materials composed of reinforcement fiber and matrix resin have been in wider use in such areas as the aerospace industry, automobile industry, sporting goods industry, and other general industries since they can be designed in a variety of forms by taking advantage of good features of reinforcement fiber and matrix resin.

The fibers that can be used for reinforcement include glass fiber, aramid fiber, carbon fiber, and boron fiber. Both thermosetting resins and thermoplastic resins may serve as matrix resin, but thermosetting resins are in wider use because they serve easily to impregnate reinforcement fiber. Useful thermosetting resins include epoxy resin, unsaturated polyester resin, vinyl ester resin, phenol resin, bismaleimide resin and cyanate resin, combined with a curing agent or curing catalyst to provide a resin composition.

Various methods are available for the production of fiber reinforced composite materials, but attention is now focused on the RTM (resin transfer molding) technique, a low cost production method that uses a mold containing reinforcement fiber base material to which liquid thermosetting resin (matrix resin) is added and cured by heating to produce fiber reinforced composite material.

In many processes of producing fiber reinforced composite material by the RTM method, reinforcement fiber base material is first processed into a preform in a similar shape to the intended product and then the preform is placed in a mold followed by adding liquid matrix resin.

There are some known preform preparation methods including a method that contains the production of three dimensional blades from reinforcement fiber and a method that contains the stacking and stitching of sheets of reinforcement fiber woven fabric, and in particular, a method known to have high general versatility is the use of a hot melt binder (tackifier) to stack and shape sheets of base material such as reinforcement fiber woven fabric.

Resin that is not adhesive at room temperature, but can soften to become adhesive at a high temperature is used as hot-melt binder. Both thermoplastic resin and thermosetting resin may serve as hot-melt binder.

When a thermosetting resin is used as hot-melt binder, the binder per se may be of a type having curability or the binder per se may be of a type not having curability. The former is favorable since it is curable irrespective of the type of liquid matrix resin, while the latter is favorable because of having high storage stability.

On the other hand, fiber-reinforced composite material containing thermosetting resin such as epoxy resin as liquid matrix resin is known to normally lead to fiber reinforced composite material having relatively low impact resistance because as generally known, cured thermosetting resins are lower in fracture toughness than cured thermoplastic resins. Especially since structural members of aircraft are required to be high in impact resistance to such impacts caused by the drop of a tool during assembling and hail during flying, the enhancement of their impact resistance has been an important issue.

Fiber-reinforced composite materials generally have a lamination structure, and if an impact acts on it, a high stress occurs between reinforcement fiber layers to cause cracking. To inhibit such cracking, it is effective to enhance the plastic deformability of the thermosetting resin, and as a means thereof, adding thermoplastic resin with excellent plastic deformability is effective.

A known impact resistance improvement method uses a binder containing thermoplastic resin when producing fiber reinforced composite material to allow the thermoplastic resin to be interposed between stacked layers where cracking may occur easily (Japanese Unexamined Patent Publication (Kokai) No. 2005-194456, Published Japanese Translations of PCT International Publication JP 2010-510110 and JP 2001-524171, and International Publication Nos. WO 2014/007288 and WO 2011/034040).

Binders containing thermoplastic resin that can dissolve uniformly with matrix resin are disclosed JP '456 and JP '110.

Curable binders containing thermoplastic resin that can dissolve uniformly with matrix resin are disclosed JP '171 and WO '288.

A binder prepared by melt-kneading polyamide, that is, thermoplastic resin insoluble in matrix resin, with another component is disclosed in WO '040.

When using the binders disclosed in JP '456 and JP '110, the binders tend to dissolve with matrix resin during the molding of fiber reinforced composite material, often resulting in thin, non-uniform interlaminar gaps as a result of receiving the pressure during the molding step. The decrease in the interlaminar gaps acts to prevent the impregnation of the matrix resin injected, easily causing the generation of voids. Accordingly, the thermoplastic resin may fail to serve sufficiently to develop high toughness and uneven physical properties may occur depending on the molding conditions and positions in the resultant molded article.

When using the binders disclosed in JP '171 and WO '288, they are partly cured during the preforming step to allow the thermoplastic resin to penetrate into the interlaminar gaps, but the resulting fiber reinforced composite material still suffers from interlaminar non-uniformity, easily leading to generation of voids in thinner interlaminar gaps.

The binder disclosed in WO '040 contains polyamide that is insoluble in the matrix resin, and the thermoplastic resin component tends to localize in the interlaminar gaps and remain there after the molding step to serve for ensuring high toughness, but it is difficult to maintain uniform interlaminar gap thickness.

It could therefore be helpful to provide fiber reinforced composite material having uniform and adequate interlaminar gap thickness in the fiber reinforced composite material to ensure high impact resistance and stable physical properties regardless of the molding conditions and the shape and size of the intended moldings, realizes good impregnation with the matrix resin, and suffers from few voids, and also provides a preform that serves for the production of such fiber reinforced composite material.

SUMMARY

Our preforms include a plurality of reinforcement fiber layers connected by binder resin, the binder resin containing spacer particles insoluble in the binder resin, the spacer particles occupying a 10% to 80% volume in the binder resin present in the interlaminar gaps between the reinforcement fiber layers.

The fiber reinforced composite material is one that is produced by injecting and curing matrix resin in the above preform.

The method of producing fiber reinforced composite material is one in which the above preform is impregnated with matrix resin, then cured to provide fiber reinforced composite material, the binder resin being dissolved in the matrix resin during the steps of injecting and curing the matrix resin while the spacer particles are not dissolved in the matrix resin and remain in interlaminar gaps, the thickness of the interlaminar gaps being 1 to 3 times as large as the average particle diameter of the spacer particles.

We produce fiber reinforced composite material containing spacer particles in the binder resin located between reinforcement fiber base layers to provide nearly void-free fiber reinforced composite material having a uniform and adequate interlaminar gap thickness, which ensures improved impact resistance and stable physical properties regardless of the molding conditions and the shape and size of the intended moldings.

DETAILED DESCRIPTION

A preferred preform is described below.

The preform includes a plurality of reinforcement fiber layers connected by binder resin, the binder resin containing spacer particles insoluble in the binder resin, the spacer particles accounting for a specific volume proportion in the binder resin present between the reinforcement fiber layers (the volume proportion accounted for by the spacer particles in the binder resin present in the interlaminar gaps between the reinforcement fiber layers will be occasionally referred to simply as the volume proportion of the spacer particles).

The reinforcement fiber layers, each formed of reinforcement fiber base material as described later, are stacked to form a laminate and connected by binder resin present between them. Spacer particles are present in the binder resin and, during the steps of impregnating a preform with matrix resin and curing it, the spacer particles are left between the layers as a result of heat and pressure applied for molding so that uniform and appropriate interlaminar gap thickness and matrix resin flow paths required for impregnation are maintained to ensure the production of nearly void-free fiber reinforced composite material. The term "having uniform and appropriate interlaminar gap thickness" means the existence of few regions where the thickness is too large or too small, and in particular, the regions where the thickness of the interlaminar gaps is 10 µm or less, which is too small to maintain substantial interlaminar gaps, account for 30% or less.

The preform may be produced from a binder resin composition that contains binder resin and spacer particles. If such a binder resin composition exists between the reinforcement fiber layers, the binder resin works to bond the reinforcement fiber base material layers to each other to realize the connection between the reinforcement fiber layers. Such binder resin preferably contains thermosetting resin, more preferably epoxy resin.

Thermosetting resin is resin material that undergoes a curing reaction when heated to form a crosslinked structure, and examples thereof include epoxy resin, phenol resin, unsaturated polyester resin, vinyl ester resin, bismaleimide resin, and cyanate resin. Epoxy resin is preferred as such thermosetting resin.

Epoxy resin means a compound having two or more epoxy groups in one molecule. Such epoxy resin may be one compound having epoxy groups or a mixture of a plurality of such compounds.

Specific examples of such epoxy resin include those epoxy resin compounds that contain epoxy groups as part of glycidyl groups such as aromatic glycidyl ethers derived from a phenol compound having a plurality of hydroxyl groups, aliphatic glycidyl ethers derived from an alcohol compound having a plurality of hydroxyl groups, glycidyl amines derived from an amine compound, and glycidyl esters derived from a carboxylic acid compound having a plurality of carboxyl groups, and other epoxy resin compounds having a structure that contains an oxirane ring formed through oxidation of an unsaturated alicyclic compound such as cyclohexene.

Epoxy resin preferably contains a solid epoxy resin component from the viewpoint of stability during storage. Solid epoxy resin refers to epoxy resin that has a glass transition temperature of 20° C. or more.

The glass transition temperature is as determined by differential scanning calorimetry (DSC) according to JIS K 7121 (1987). The measuring apparatuses that meet the above standard include, for example, Pyris 1 DSC (manufactured by Perkin Elmer). A specimen to be examined is taken on an aluminum sampling pan and measurements are made at a heating rate of 40° C./min in a nitrogen atmosphere. The glass transition temperature is defined as the temperature at the midpoint of the part of the DSC curve thus obtained where the baseline shifts to the endothermic side.

The epoxy resin component to be used preferably contains at least one epoxy resin selected from the group consisting of bisphenol type epoxy resin, novolac type epoxy resin, and aralkyl type epoxy resin because they can realize strong adhesion between reinforcement fiber base material layers and undergo uniform dissolving with matrix resin to serve for production of fiber reinforced composite material having toughness and heat resistance in a good balance.

Specific examples of the bisphenol type epoxy resin include, but not limited to, bisphenol A type epoxy resin, bisphenol F type epoxy resin, bisphenol S type epoxy resin, bisphenol E type epoxy resin, and bisphenol Z type epoxy resin, as well as alkyl substitutes, halogen substitutes, and hydrogenated substances thereof.

Specific examples of novolac type epoxy resin include commercially available products of phenol novolac type epoxy resin such as jER (registered trademark) 152 and 154 (both manufactured by Mitsubishi Chemical Corporation), and Epiclon (registered trademark) N-740, N-770, and N-775 (all manufactured by DIC); and commercially available products of cresol novolac type epoxy resin such as Epiclon (registered trademark) N-660, N-665, N-670, N-680, and N-695 (all manufactured by DIC); EOCN-1020 and EOCN-1025 (both manufactured by Nippon Kayaku Co., Ltd.), and YDCN-700 and YDCN-701 (both manufactured by Nippon Steel Chemical Co., Ltd.).

Specific examples of aralkyl type epoxy resin include commercially available products of phenol aralkyl type epoxy resin such as NC-2000 series (manufactured by Nippon Kayaku Co., Ltd.), NC-7000 series (manufactured by Nippon Kayaku Co., Ltd.), and NC-3000 series (manufactured by Nippon Kayaku Co., Ltd.); and commercially available products of naphthol aralkyl type epoxy resin include NC-7300 series (manufactured by Nippon Kayaku Co., Ltd.), and ESN-165, ESN-175, ESN-185, and ESN-195 (all manufactured by Nippon Steel & Sumikin Chemical Co., Ltd.).

When using a binder resin that contains thermosetting resin, it is further preferable for the binder resin to contain thermoplastic resin soluble in the thermosetting resin contained in the binder resin to provide fiber reinforced composite material having improved interlaminar toughness.

"Being soluble in thermosetting resin" means that when the thermoplastic resin is dispersed in the thermosetting resin and then the dispersion is heated, the thermoplastic resin forms a uniform phase with the thermosetting resin.

More specifically, it can be confirmed by, for example, mixing 5 parts by mass of the thermoplastic resin in 100 parts by mass of the thermosetting resin, heating and stirring the mixture at a predetermined temperature to prepare a sample containing a resin composition, and observing it under an optical microscope to check that there is no definite interface formed between the thermosetting resin and the thermoplastic resin.

Examples of such thermoplastic resin soluble in thermosetting resin that may be contained in binder resin include various types of polyacetal, polyphenylene ether, polyphenylene sulfide, polyallylate, polyester, polyethersulfone, polysulfone, polyetherimide, polyether ketone, polyether ether ketone, polyaramid, polyether nitrile, polybenzimidazole, polyurethane, urea resin, polyvinyl acetal, polyvinyl formal, polyvinyl alcohol, polymethyl methacrylate, and phenoxy resin that are soluble in the particular thermosetting resin contained in the binder resin. In particular, polyethersulfone, polysulfone, polyetherimide, polyvinyl acetal, polyvinyl formal, polyvinyl alcohol, and phenoxy resin are preferred.

The thermoplastic resin soluble in thermosetting resin that may be contained in the binder resin is preferably at least one selected from the group consisting of polyethersulfone, polysulfone, polyetherimide, polyvinyl acetal, polymethyl methacrylate, and phenoxy resin from the viewpoint of the heat resistance, impact resistance, and interlaminar toughness of the intended fiber reinforced composite material.

The thermoplastic resin soluble in thermosetting resin that may be contained in the binder resin preferably has a glass transition temperature of 150° C. or more, more preferably 180° C. or more. If the glass transition temperature is less than 150° C., the resulting fiber reinforced composite material may not be sufficiently high in heat resistance. The thermoplastic resin soluble in thermosetting resin that may be contained binder resin preferably has a glass transition temperature of 280° C. or less, more preferably 250° C. or less. If the glass transition temperature is more than 280° C., the compatibility with the thermosetting resin may decrease.

The thermoplastic resin soluble in thermosetting resin that may be contained in the binder resin preferably accounts for 5 to 80 mass %, more preferably 20 to 60 mass %, of the total mass of the binder resin. If the content of the thermoplastic resin soluble in thermosetting resin that may be contained in the binder resin is less than 5 mass %, there may not occur the effect of interlaminar toughness improvement. If the content of the thermoplastic resin soluble in thermosetting resin that may be contained in the binder resin is more than 80 mass %, on the other hand, the resulting preform may be low in adhesiveness. Note that the total mass of the binder resin as referred to herein does not include the mass of the spacer particles.

The addition of spacer particles is intended to allow fiber reinforced composite material that has uniform interlaminar gap thickness and contains few voids to be produced by impregnating a preform with matrix resin and curing it.

In the preform, the spacer particles account for a 10% to 80% volume proportion in the binder resin present between reinforcement fiber layers. If the volume proportion of the spacer particles in the binder resin present between reinforcement fiber layers is less than 10%, the resulting fiber reinforced composite material will fail to have adequately thick interlaminar gaps, leading to uneven interlaminar gap thickness distribution. From such a viewpoint, the spacer particles preferably account for a volume proportion of 15% or more, more preferably 20% or more. If the spacer particles account for a volume proportion of more than 80%, the binder may fail to perform the expected binding function. From such a viewpoint, the spacer particles preferably account for a volume proportion of 60% or less, more preferably 50% or less.

The volume proportion of the spacer particles in the binder resin present between reinforcement fiber layers can be determined by, for example, observing by scanning electron microscopy a cross section of a preform sample at 100 arbitrarily selected positions and calculating the average proportion of the area occupied by the spacer particles to the total area occupied by the binder resin present between the reinforcement fiber layers and the spacer particles.

The quantity of the spacer particles present in the interlaminar gaps between the reinforcement fiber layers is preferably 2 to 9 $g/m^2$, more preferably 2 to 7 $g/m^2$, in each interlaminar gap. If the quantity is less than 2 $g/m^2$, the spacer particles may not serve sufficiently to maintain required interlaminar gaps in the resulting fiber reinforced composite material, whereas if it is more than 9 $g/m^2$, the degree of impregnation with matrix resin may decline, possibly leading to the generation of voids.

Regarding the total quantity of binder resin and spacer particles in the interlaminar gaps between reinforcement fiber layers in the preform, the quantity of a binder resin composition such as the binder resin composition described later, for example, is preferably 0.5 to 50 $g/m^2$, more preferably 1 to 30 $g/m^2$, in each interlaminar gap between reinforcement fiber layers. If this quantity is less than 0.5 $g/m^2$, it is difficult for the preform to maintain a fixed shape and the spacer particles may not serve sufficiently to maintain required interlaminar gaps in the resulting fiber reinforced composite material, whereas if it is more than 50 $g/m^2$, the degree of impregnation with matrix resin may be low, possibly leading to the generation of voids.

The total quantity of binder resin and spacer particles in the interlaminar gaps between reinforcement fiber layers in the preform can be determined by calculating the average of 100 measurements of the mass per unit area of the preform that are taken at randomly selected different positions, and the average of the mass measurements of the reinforcement fiber base material present in the preform that are taken after removing the binder resin and spacer particles from the preform by burning out through heat treatment or by dissolution in a solvent, and dividing their difference by the number of interlaminar gaps present in the preform.

It is preferable for the spacer particles to be insoluble in the binder resin and also insoluble in the matrix resin used to impregnate the preform that is adopted for producing fiber reinforced composite material as described later.

"Being insoluble in binder resin" and "being insoluble in matrix resin" mean that there is definite interface formed between the spacer particles and binder resin or matrix resin when the binder resin or matrix resin containing the dispersed spacer particles is heated and cured.

More specifically, we confirmed by, for example, dispersing 5 parts by mass of spacer particles in 100 parts by mass of binder resin or matrix resin and observing a specimen containing the resulting resin composition heated at an appropriate temperature on the hot stage of an optical microscope to check for an interface between the spacer particles and the binder resin or matrix resin.

The spacer particles preferably have a sphericity of 75 to 100 and more preferably have a sphericity of 85 to 100. Such a relatively high sphericity enables the production of fiber reinforced composite material having uniform interlaminar gap thickness. A sphericity of less than 75 may lead to fiber reinforced composite material with interlaminar gaps having an uneven thickness distribution.

The sphericity is determined by observing the spacer particles by scanning electron microscopy, appropriately selecting m (commonly 30) particles, measuring the shortest diameter and longest diameter of each of them from their projection, and making calculations according to equation (1). The shortest diameter and the longest diameter of a particle refer to the short side and the long side, respectively, of the smallest rectangle that is circumscribed thereto.

$$\text{Sphericity} = \frac{\sum_{i=1}^{m} (\text{shortest diameter}/\text{longest diameter})}{m} \times 100 \quad (1)$$

The spacer particles preferably have a particle diameter distribution index of 1 to 5 and more preferably have a particle diameter distribution index of 1 to 2.5. Such a relatively narrow particle diameter distribution serves effectively to produce fiber reinforced composite material in which interlaminar gaps are filled with particles at a high filling factor. They also serve to produce fiber reinforced composite material with a uniform interlaminar gap thickness while preventing regions with an excessively large interlaminar gap thickness from being formed as a result of the existence of some bulky particles. A particle diameter distribution index of more than 5 may lead to difficulty in filling the interlaminar gaps with particles at a high filling factor or may cause an uneven interlaminar gap thickness distribution.

The particle diameter distribution index is determined by observing the spacer particles by scanning electron microscopy, appropriately selecting n (commonly 100) particles, measuring their particle diameters, and making calculations according to equations (2) to (4). For a particle that does not have a perfectly spherical projected shape, its longest diameter is adopted as its particle diameter.

$$Dn = \sum_{i=1}^{n} Di/n \quad (2)$$

$$Dv = \sum_{i=1}^{n} Di^4 \bigg/ \sum_{i=1}^{n} Di^3 \quad (3)$$

$$PDI = Dv/Dn \quad (4)$$

Di, n, Dn, Dv, and PDI denote the particle diameter of a particular particle, number of measurements, number average particle diameter, volume average particle diameter, and particle diameter distribution index, respectively.

The spacer particles preferably have an average particle diameter of 1 to 50 μm, more preferably of 5 to 30 μm. This average particle diameter refers to the number average particle diameter determined from diameter measurements of 100 randomly selected spacer particles observed by scanning electron microscopy at a magnification of 1,000 times. For a particle that does not have a perfectly spherical shape, its longest diameter is measured and adopted as its particle diameter or discarded if the diameter is 100 nm or less. Small particles having an average particle diameter of less than 1 μm may fail to ensure required interlaminar gap thickness in the intended fiber reinforced composite material due to the penetration of spacer particles into reinforcement fiber layers during its production. Large particles having an average particle diameter of more than 50 μm may lead to the formation of regions containing interlaminar gaps with excessively large thickness attributed to the presence of bulky particles, possibly causing an uneven interlaminar gap thickness distribution. A mixture of a plurality of different types of spacer particles may be used.

There are no specific limitations on the components that constitute the spacer particles and usable ones include organic particles such as rubber particles, thermoplastic resin particles, and thermosetting resin particles, and inorganic particles such as silica, alumina, smectite, synthetic mica, and metal particles.

In particular, the spacer particles to be adopted are preferably polymer particles containing those of thermoplastic resin and/or thermosetting resin from the viewpoint of adhesion to the cured matrix resin and interlaminar toughness in the resulting fiber reinforced composite material, and a plurality of different types may be used in combination. The expression "particles containing those of thermoplastic resin and thermosetting resin" refers to a composition containing both of them.

Specific examples of such thermosetting resin usable for the spacer particles include epoxy resin, benzoxazine resin, vinyl ester resin, unsaturated polyester resin, urethane resin, phenol resin, melamine resin, maleimide resin, cyanate ester resin, and urea resin. These thermosetting resins may be either in an uncured state or in a cured state.

Specific examples of such thermoplastic resin usable for the spacer particles include vinyl based polymers, polyester, polyamide, polyamide-imide, polyimide, polycarbonate, polyarylene sulfides (such as polyphenylene sulfide), polyarylene ethers (such as polyphenylene ether), polyethersulfone, polysulfone, polyether ketone, polyphenylene ether, polyether ether ketone, polyether ether sulfone, polyurethane, polyetherimide, polyacetal, silicone, copolymers thereof, provided that they are insoluble in the binder resin used. Among others, those preferable for spacer particles include polyamide, polyamide-imide, polyimide, polycarbonate, polyphenylene sulfide, polyphenylene ether, polyether ether ketone, and these copolymer from the viewpoint of elongation and toughness. Furthermore, polyamide is particularly preferable because it can ensure high moist heat resistance and solvent resistance as well as high impact resistance and interlaminar toughness in the resulting fiber reinforced composite material. Examples of such polyamide include polyhexamethylene terephthalamide (nylon 6T), polynonane terephthalamide (nylon 9T), poly-m-xylene adipamide (nylon MXD), copolymers of 3,3'-dimethyl-4,4'-diaminodicyclohexyl methane, isophthalic acid, and 12-aminododecanoic acid (for instance, Grilamid (registered trademark) TR55, manufactured by Emser Werke, Inc.), copolymers of 3,3'-dimethyl-4,4'-diaminodicyclohexyl methane and dodeca diacid (for instance, Grilamid (registered trademark) TR90, manufactured by Emser Werke, Inc.), and copolymers of 4,4'-diaminodicyclohexyl methane and dodeca diacid (for instance, Troga mid (registered trademark) CX7323, manufactured by Degussa AG).

The spacer particles are preferably polymer particles having a glass transition temperature of 80° C. or more, more preferably polymer particles having a glass transition temperature of 130° C. or more. If their glass transition temperature is less than 80° C., deformation of the particles may occur during the impregnation and curing of the matrix resin, possibly leading to an uneven interlaminar gap thickness distribution. In addition, the spacer particles are preferably polymer particles having a glass transition temperature of 350° C. or less, more preferably polymer particles having a glass transition temperature of 300° C. or less. If the glass transition temperature is more than 350° C., it may lead to an uneven interlaminar gap thickness distribution.

The binder resin composition is used in the aforementioned preform or in the reinforcement fiber base material carrying a binder resin composition described later, and it consists mainly of the aforementioned binder resin and the aforementioned spacer particles.

The spacer particles present in the binder resin composition contained in a precursor preferably accounts for 5 to 80 mass %, more preferably 10 to 50 mass %, of the total quantity thereof. If the content of the spacer particles in the binder resin composition is less than 5 mass %, interlaminar gaps with an adequate thickness may not be formed in some cases. If the content of the spacer particles in the binder resin composition is more than 80 mass %, on the other hand, the interlaminar adhesive strength in the resulting preform may decrease and they may fail to function as binder.

There are no specific limitations on the form of the binder resin composition, and they may be in various forms including film, tape, long fiber, short fiber, spun yarn, woven fabric, knit fabric, nonwoven fabric, net, and particle. Of these, the form of particles or fibers is particularly preferred. Hereinafter, when the binder resin composition is in the form of particles, the particles of the binder resin composition are referred to as binder particles, whereas in the case where the binder resin composition is in the form of fibers, the fibers of the binder resin composition are referred to as binder fibers.

For a binder resin composition in the form of particles, it is preferable for them to have an average particle diameter of 10 to 500 μm. The average particle diameter refers to the median diameter, and the average particle diameter of binder particles can be measured by, for example, using a laser diffraction particle size analyzer. If the average particle diameter is less than 10 μm, it may lead to a preform with decreased adhesive strength and workability. From such a point of view, the average particle diameter is more preferably 30 μm or more. An average particle diameter of more than 500 μm may lead to a preform suffering from undulation in the reinforcement fiber, possibly resulting in fiber reinforced composite material with deteriorated mechanical characteristics. From such a point of view, the average particle diameter is more preferably 300 μm or less.

For a binder resin composition in the form of fibers, it is preferable for them to have an average diameter of 10 to 300 μm. The average diameter is determined from scanning electron microscopic observations of cross sections of binder fibers. The diameters of 100 randomly selected binder fibers are measured and their average is calculated. For a binder fiber that does not have a perfectly spherical cross section, its shortest diameter is adopted as its diameter. If the average diameter is less than 10 μm, it may lead to a preform with decreased adhesive strength. An average diameter of more than 300 μm may lead to a preform suffering from undulation in the reinforcement fiber, possibly resulting in fiber reinforced composite material with deteriorated mechanical characteristics. From such a point of view, the average diameter is more preferably 100 μm or less.

Examples of such reinforcement fiber to be used in the preform include carbon fiber, glass fiber, aramid fiber, metal fiber, and combinations thereof. In particular, carbon fiber can be used favorably because it is light and strong.

The reinforcement fiber may be in the form of short fiber, continuous fiber, or combinations thereof. The use of continuous fiber is preferred to obtain fiber reinforced composite material with a high fiber volume fraction (hereinafter abbreviated as high Vf).

Reinforcement fiber may be used in the form of strands, but it is generally preferred to use reinforcement fiber after processing it into reinforcement fiber base material in the form of mat, woven fabric, knit fabric, braid, or one-directional sheet. In particular, woven fabrics and one-directional sheets are preferred as reinforcement fiber base material because they serve to easily obtain fiber reinforced composite material with a high Vf and they are high in handleability.

If woven fabrics are adopted to form reinforcement fiber base material, they may be in an appropriate woven form selected from the group of plain weave, sateen weave, diagonal weave, and non-crimp cloth. If clear coating is adopted to allow weave texture to appear in the decorative plane, good design characteristics may be obtained by using fabrics of plain weave or diagonal weave. Having good drape properties, furthermore, fabrics of sateen weave or diagonal weave are preferred when processing them into a deep three dimensional shape.

The ratio of the net volume of the reinforcement fiber to the apparent volume of the reinforcement fiber woven fabric is defined as the filling factor of the reinforcement fiber woven fabric. The filling factor of reinforcement fiber woven fabric is expressed as $W/(1,000 t \cdot \rho f)$ where W (in $g/m^2$) is the weight, t (in mm) the thickness, and $\rho f$ (in $g/cm^3$) the density of the reinforcement fiber. The weight and thickness of reinforcement fiber woven fabric are determined according to JIS R 7602 (1995). As woven fabric with a higher filling factor serves to provide fiber reinforced composite material with a higher fiber volume fraction, the filling factor of woven fabric is preferably 0.10 to 0.85, more preferably 0.40 to 0.85, and still more preferably 0.50 to 0.85.

The binder resin composition is at least attached to the surface of reinforcement fiber base material and used in the form of reinforcement fiber base material carrying a binder resin composition. Thus, the binder resin composition is not only used in the aforementioned preform, but also used in such reinforcement fiber base material carrying a binder resin composition. Also, the reinforcement fiber base material carrying a binder resin composition has the aforementioned binder resin composition at least on the surface and can be used in the aforementioned preform.

When attaching the binder resin composition to the surface, it may be attached to either side or both sides preferably with a weight of 0.5 to 50 $g/m^2$, more preferably 1 to 30 $g/m^2$. If this attached quantity is less than 0.5 $g/m^2$, it will be difficult for the preform to maintain a fixed shape and the spacer particles may not serve sufficiently to maintain required interlaminar gaps in the resulting fiber reinforced composite material, whereas if it is more than 50 $g/m^2$, the degree of impregnation with matrix resin may be insufficiently low, possibly leading to the generation of voids.

The preform is produced by preparing sheets of reinforcement fiber base material carrying a binder resin composition, which have the binder resin composition at least on a surface thereof, stacking them, and fixing the shape. The binder resin composition is heated and attached at least to the surface at least on one side of reinforcement fiber base material to provide sheets of reinforcement fiber base material carrying a binder resin composition, and a plurality thereof are stacked to provide a laminate having the binder resin composition at least in the interlaminar gaps between the stacked layers. This is then heated and cooled so that the binder resin composition acts to bond between the base sheets, thereby fixing the shape to provide a preform having the binder resin composition at least between the stacked layers.

Commonly, a preform can be produced by cutting sheets of the reinforcement fiber base material carrying the binder resin composition, which contain the binder resin composition, to predetermined shape, stacking them on a mold, and applying appropriate degrees of heat and pressure. Available compression methods include the applying of a pressure under a press, and the enclosing of the preform with vacuum bag film followed by aspirating air from inside using a vacuum pump to achieve compression under atmospheric pressure.

For the preform, the interlaminar gap thickness between the reinforcement fiber layers is preferably 1 to 5 times as large as the average particle diameter of the spacer particles. If the interlaminar gap thickness between the reinforcement fiber layers is smaller than the average particle diameter of the spacer particles, it may be impossible to produce fiber reinforced composite material having required interlaminar gaps. If it is larger than 5 times the average particle diameter of the spacer particles, an uneven interlaminar gap thickness distribution may be left in the resulting fiber reinforced composite material.

The interlaminar gap thickness between reinforcement fiber layers in the preform can be determined by, for example, observing by scanning electron microscopy a cross section of a preform sample at 100 randomly selected positions and measuring the distance between the boundary lines that define the fiber layers and the interlaminar gaps in the region containing the binder resin composition, followed by averaging the measurements.

Fiber reinforced composite material can be produced by impregnating the preform with matrix resin and then curing the matrix resin.

If suitable materials are selected from those listed previously for the binder resin and spacer particles, the binder resin will be dissolved in the matrix resin during the process of impregnation with and curing of the matrix resin while spacer particles are not dissolved in the matrix resin and left in the interlaminar gaps. Due to such locations of the spacer particles, the interlaminar gap thickness in the resulting fiber reinforced composite material is preferably 1 to 3 times as large as the average particle diameter of the spacer particles. If the interlaminar gap thickness is smaller than the average particle diameter of the spacer particles, the spacer particles will fail to form required interlaminar gaps, leading to an uneven interlaminar gap thickness distribution. If it is larger than 3 times the average particle diameter, the spacer particles will fail to work effectively, possibly leading to an uneven interlaminar gap thickness distribution.

It is preferable for the fiber reinforced composite material to have an interlaminar gap thickness of 1 to 150 μm. If the interlaminar gap thickness is less than 1 μm, adequate interlaminar gaps are not maintained. If it is more than 150 μm, it may lead to an uneven interlaminar gap thickness distribution.

There are no specific limitations on the production method for the fiber reinforced composite material, but molding methods that use two-component resin such as hand lay-up method and RTM method, are preferred. Of these, the RTM method is particularly preferred from the viewpoint of productivity and the degree of freedom of shape of the moldings to be produced. In the RTM method, sheets of reinforcement fiber base material are placed in a mold and liquid matrix resin is injected for impregnation, followed by curing it to provide fiber reinforced composite material.

The matrix resin is a liquid thermosetting resin that contains a liquid resin formed mainly of monomer components and a curing agent or curing catalyst that works to crosslink the monomer components three dimensionally to form a polymer.

The monomer component is preferably an epoxy resin from the viewpoint of suitability for impregnation of a preform and mechanical characteristics of the resulting fiber reinforced composite material.

Specific examples of such epoxy resin include aromatic glycidyl ethers produced from a phenol having a plurality of hydroxyl groups, aliphatic glycidyl ethers produced from an alcohol having a plurality of hydroxyl groups, glycidyl amines produced from an amine, glycidyl esters produced from a carboxylic acid having a plurality of carboxyl groups, and epoxy resins having an oxirane ring.

Suitable curing agents include aliphatic polyamines, aromatic polyamines, acid anhydrides, imidazoles, and Lewis acid complexes, of which an appropriate one may be selected for a particular use.

Matrix resin is injected in a preform and cured it to produce fiber reinforced composite material. Commonly, its curing progresses when heated. The mold temperature during the heat-curing step may be the same as the mold temperature during the matrix resin injection and impregnation step. However, when curing is performed at a low temperature, a long time may be required to continue the curing until the resulting fiber reinforced composite material becomes so rigid that it is not likely to undergo significant deformation as it is removed from the mold and therefore, it is preferable for the heat-curing temperature to be higher than the mold temperature in the injection step. For example, it is preferably 60° C. to 180° C.

As described above, the binder resin is dissolved in the matrix resin during the process of impregnation with and curing of the matrix resin while the spacer particles are not dissolved in the matrix resin and left in the interlaminar gaps, and it is preferable for the interlaminar gap thickness to be 1 to 3 times as large as the average particle diameter of the spacer particles.

For the fiber reinforced composite material to have a high specific strength or a high specific modulus, the fiber volume fraction Vf is preferably 40 to 85%, more preferably 45 to 85%. For fiber reinforced composite material obtained after injecting liquid matrix resin into reinforcement fiber base material and curing it, the fiber volume fraction Vf as referred to herein is defined and determined as follows according to ASTM D3171 (1999). Thus, the fiber volume fraction Vf of fiber reinforced composite material can be calculated by formula (5) given below from the thickness h of the fiber reinforced composite material:

$$\text{Fiber volume fraction } Vf\ (\%) = (Af \times N)/(\rho f \times h)/10 \tag{5}$$

Af: mass per m² (g/m²) of a sheet of reinforcement fiber base material

N: number of stacked sheets of reinforcement fiber base material (number)

ρf: density (g/cm³) of reinforcement fiber h: thickness (mm) of fiber reinforced composite material (test piece).

If the mass per m² of a sheet of reinforcement fiber base material, Af, the number of stacked sheets of reinforcement fiber base material, N, or the density of the reinforcement fiber, ρf, is not known, the combustion method, nitric acid decomposition method, or sulfuric acid decomposition method specified in JIS K 7075 (1991) is used to determine the fiber volume fraction of fiber reinforced composite material. The density of reinforcement fiber to be used for this calculation is measured according to JIS R 7603 (1999).

EXAMPLES

Our preforms, composites and methods are described in more detail below with reference to Examples.

1. Raw Material for Binder Resin Composition

The following raw resin materials were used to prepare a binder resin composition in each Example. In Tables, the contents of the resin compositions are expressed in parts by mass unless otherwise specified.

Components of Binder Resin: An Epoxy Resin and a Thermoplastic Resin Soluble in the Epoxy Resin jER (registered trademark) 825 (manufactured by Mitsubishi Chemical Corporation): liquid bifunctional bisphenol A type epoxy resin, epoxy equivalent 175 jER (registered trademark) 1007 (manufactured by Mitsubishi Chemical Corporation): solid bifunctional bisphenol A type epoxy resin, epoxy equivalent 1925

Epiclon (registered trademark) N-660 (manufactured by DIC): solid cresol novolac type epoxy resin, epoxy equivalent 207

NC-7300 (manufactured by Nippon Kayaku Co., Ltd.): solid naphthol aralkyl type epoxy resin, epoxy equivalent 220

Sumikaexcel (registered trademark) PES5200P (manufactured by Sumitomo Chemical Co., Ltd.): polyethersulfone, mass average molecular weight 55,100

Ultem (registered trademark) 1010 (manufactured by GE Plastics): polyetherimide, mass average molecular weight 55,000

YP-50 (manufactured by Nippon Steel & Sumikin Chemical Co., Ltd.): phenoxy resin, weight average molecular weight 70,000

Spacer Particles: Polymer Particles Insoluble in Epoxy Resin

Particle 1 (Particles produced by the following production method from Grilamid (registered trademark) TR55 manufactured by Emser Werke, Inc., used as raw material, and having an average particle diameter of 18.0 μm, particle diameter distribution index of 1.5, sphericity of 85, and Tg of 160° C.).

Production Method for Particle 1

First, 94 parts by mass of polyamide (Grilamid (registered trademark) TR-55, manufactured by Emser Werke, Inc.), which contains 4,4'-diamino-3,3'-dimethyl dicyclohexyl methane as essential component, 4 parts by mass of epoxy resin (jER (registered trademark) 828 manufactured by Japan Epoxy Resins Co., Ltd.), and 2 parts by mass of a curing agent (Tormide (registered trademark) #296 manufactured by Fuji Kasei Kogyo Co., Ltd.) were added to a mixed solvent composed of 300 parts by mass of chloroform and 100 parts by mass of methanol to provide a uniform solution. Then, using a spray gun designed for painting, the solution was sprayed strongly against the liquid surface of 3,000 parts by mass of well-stirred n-hexane to separate out the solute. The solid material thus separated was filtered out, washed well with n-hexane, vacuum-dried at 100° C. for 24 hours, and passed through sieves to remove particles with small diameters and those with large diameters to obtain particles with a relatively narrow particle diameter distribution. The resulting powder was observed by scanning electron microscopy and it was found that the particles had an average particle diameter of 18.0 μm, particle diameter distribution index of 1.5, and sphericity of 85.

Particle 2 (Orgasol (registered trademark) 1002D, polyamide, manufactured by Arkema K.K., average particle diameter 21 μm particle diameter distribution index 1.9, sphericity 78, and glass transition temperature 53° C.)

Particle 3 (particles produced by the following method from Trogamid (registered trademark) CX7323 used as raw material, and having an average particle diameter of 13 particle diameter distribution index of 1.2, sphericity of 97, and glass transition temperature 137° C.) Production method for particle 3: by reference to International Publication WO 2009/142231

In a 1,000 ml pressure resistant glass autoclave (Hyperglasstor TEM-V1000N, manufactured by Taiatsu Techno Corporation), 35 g of polyamide (Trogamid (registered trademark) CX7323, manufactured by Degussa, mass average molecular weight 17,000) used as polymer A, 287 g of N-methyl-2-pyrolidone used as organic solvent, and 28 g of polyvinyl alcohol (Gohsenol (registered trademark) GM-14, manufactured by Nippon Synthetic Chemical Industry Co., Ltd., mass average molecular weight 29,000, sodium acetate content 0.23 mass %, SP value 32.8 (J/cm³)$^{1/2}$) used as polymer B were fed and the autoclave was filled with nitrogen to more than 99 vol %, followed by heating at 180° C. and stirring for 2 hours to ensure dissolution of the polymers. Subsequently, 350 g of ion-exchanged water, used as poor solvent, was supplied through a solution feeding pump, and dropped at a rate of 2.92 g/min. The solution turned to white when the added quantity of the ion-exchanged water reached about 200 g. After finishing the addition of the total quantity of water, the temperature was lowered while continuing stirring, and the resulting suspension liquid was filtered, followed by reslurry washing with 700 g of ion-exchanged water and separation of solid material, which was then vacuum-dried at 80° C. for 10 hours to provide 34 g of a gray solid material. The resulting powder was observed by scanning electron microscopy and found to be highly spherical fine particles with an average particle diameter of 13 μm and particle diameter distribution index of 1.2.

Particle 4 (SP-500, polyamide, manufactured by Toray Industries, Inc., average particle diameter 5 μm, particle diameter distribution index 1.1, sphericity 96, and glass transition temperature 55° C.)

Particle 5 (Torlon (registered trademark) 4000TF, polyamide-imide, manufactured by Solvay Advanced Polymers K.K., classified to average particle diameter 15 μm, particle diameter distribution index 1.5, sphericity 91, and glass transition temperature 53° C.)

Particle 6 (produced by freezing, crushing by hammer mill, and classifying polyamide (Grilamid (registered trademark) TR55, manufactured by Emser Werke, Inc.) containing 4,4'-diamino-3,3'dimethyl dicyclohexyl methane as essential component; average particle diameter 45 μm, particle diameter distribution index 3.2, sphericity 65, and glass transition temperature 167° C.; occasionally referred to as pulverized TR55 (1))

Particle 7 (produced by freezing, crushing by hammer mill, and classifying polyamide (Grilamid (registered trademark) TR55, manufactured by Emser Werke, Inc.) containing 4,4'-diamino-3,3'dimethyl dicyclohexyl methane as essential component; average particle diameter 55 μm, particle diameter distribution index 2.4, sphericity 76, and glass transition temperature 167° C.; occasionally referred to as pulverized TR55 (2))

2. Carbon Fiber Woven Fabric

The reinforcement fiber woven fabric used in the examples was prepared as described below. Carbon fiber bundles of Torayca (registered trademark) T800S-24K-10E (PAN based carbon fiber manufactured by Toray Industries, Inc., 24,000 filaments, fineness 1,033 tex, tensile modulus 294 GPa) were paralleled at a density of 1.8 bundles/cm as warp, and glass fiber bundles of ECDE-75-1/0-1.0Z (manufactured by Nitto Boseki Co., Ltd., 800 filaments, fineness 67.5 tex) were paralleled at a density of 1.8 bundles/cm as auxiliary warp, the glass fiber bundles and the carbon fiber bundles being parallel to each other and arranged alternately to form a unidirectional sheet of reinforcement fiber bundles. As weft, glass fiber bundles of E-glass Yarn ECE-225-1/0-1.0Z (manufactured by Nitto Boseki Co., Ltd., 200 filaments, fineness 22.5 tex) were arranged at a density of 3 bundles/cm in the direction perpendicular to the aforementioned unidirectional sheet of reinforcement fiber bundles. The auxiliary warp yarns and the weft yarns were woven using a loom so that they were crossed over and under each other to prepare a unidirectional non-crimp woven fabric in which the carbon fibers were arranged substantially in one direction without crimps. The proportion of the fineness of the weft yarns to the fineness of the carbon fiber bundles in the resulting reinforcement fiber woven fabric was 2.2%, and the proportion of the fineness of the auxiliary warp yarns was 6.5%. The carbon fiber had a weight of 192 g/m² and the resulting reinforcement fiber woven fabric had a filling rate of 0.45.

3. Matrix Resin

The matrix resin used in Examples was a two-component type amine-curable epoxy resin, which was prepared as described below.

First, 50 parts of Araldite (registered trademark) MY721 (composed mainly of N,N,N',N'-tetraglycidyl-4,4'-methylenedianiline, manufactured by Huntsman Japan K.K.) and 50 parts of GAN (composed mainly of N,N-diglycidylaniline, manufactured by Nippon Kayaku Co., Ltd.), which were adopted as monomer components, were mixed at a temperature of 70° C. to provide base resin.

Besides the base resin, 29.3 parts of jER Cure (registered trademark) W (composed mainly of diethyl toluene diamine, manufactured by Mitsubishi Chemical Corporation) and 12.6 parts of 3,3'-DAS (composed mainly of 3,3'-diaminodiphenyl sulfone, manufactured by Konishi Chemical Ind. Co., Ltd.) were mixed while stirring at a temperature of 130° C. until solid material no longer existed, thus providing a curing agent.

4. Measurement of Average Particle Diameter, Sphericity, and Particle Diameter Distribution Index of Spacer Particles The particle diameter of individual spacer particles was measured by observing the particles by scanning electron microscopy (JSM-6301NF scanning electron microscope, manufactured by JEOL Ltd.) at a magnification of 1,000 times and diameter measurements more than 100 nm were adopted. If the projected shape of a particle is not perfectly circular, its longest diameter was measured and used as its particle diameter.

To determine the average particle diameter, 100 particles in a photograph were randomly selected and their diameters were measured, followed by calculating the arithmetic average. The average particle diameter referred to herein is the number average particle diameter.

The sphericity is determined by measuring the longest and shortest diameters of randomly selected 30 particles in a photograph, and calculating the sphericity by equation (1) in which m=30:

$$\text{Sphericity} = \frac{\sum_{i=1}^{m}(\text{shortest diameter}/\text{longest diameter})}{m} \times 100. \quad (1)$$

The particle diameter distribution index, which represents the particle diameter distribution, was calculated by equations (2) to (4), in which n=100, using the diameters of individual particles determined above:

$$Dn = \sum_{i=1}^{n} Di/n \quad (2)$$

$$Dv = \sum_{i=1}^{n} Di^4 / \sum_{i=1}^{n} Di^3 \quad (3)$$

$$PDI = Dv/Dn. \quad (4)$$

5. Preparation of Binder Resin Composition

The raw materials (epoxy resin, thermoplastic resin soluble in epoxy resin, and polymer particles insoluble in epoxy resin) given in Table 1 were mixed at the specified compounding ratio and kneaded under the temperature condition of 180° C. in a small twin screw extruder (S1KRC Kneader, manufactured by Kurimoto, Ltd.) to prepare a binder resin composition.

6. Preparation of Binder Particles

The binder resin composition prepared were freeze-crushed in a hammer mill (Pulverizer, manufactured by Hosokawa Micron Corporation) using a screen with an opening size of 1 mm and liquid nitrogen to provide binder particles. The particles were passed through two sieves with an opening size of 150 μm and 75 μm, and the binder particles left on the sieve with an opening size of 75 μm were used for evaluation.

7. Measurement of Average Particle Diameter of Binder Particles

A total of 500 measurements were made by a laser diffraction/scattering particle size distribution analyzer (MT3300II, manufactured by Nikkiso Co., Ltd.) and used to determine the median diameter, which was adopted as the average particle diameter of the binder particles.

8. Measurement of Glass Transition Temperature of Spacer Particles, Thermoplastic Resin Soluble in Binder Resin, and Binder Particles The spacer particles, thermoplastic resin soluble in binder resin, and binder particles were used as specimens to determine the midpoint glass transition temperatures by a differential scanning calorimeter (DSC) according to JIS K 7121 (1987). The measuring equipment used was Pyris1 DSC (manufactured by Perkin Elmer). A 5 to 10 mg specimen was taken on an aluminum sample pan and measurements were taken in a nitrogen atmosphere at a heating rate of 40° C./min over the temperature range of −30 to 300° C. In the portion of the DSC curve where the curve showed a step-like change toward the endothermic side, straight lines were extended from the baselines and the glass transition temperature was determined from the point of intersection between the straight line that is equidistant in the longitudinal axis direction from the former straight lines and the step-like portion of the glass transition curve.

9. Preparation of Reinforcement Fiber Base Material Carrying a Binder Resin Composition The resulting binder particles were spread over a surface of the aforementioned carbon fiber woven fabric to a weight of 25 g/m$^2$. Subsequently, heating was performed using a far-infrared heater to cause fusion bonding of the binder particles to provide reinforcement fiber base material carrying a binder resin composition, which had binder particles attached on one surface.

10. Preparation of Preform

The resulting reinforcement fiber base material carrying a binder resin composition was cut to predetermined size and four sheets of the reinforcement fiber base material carrying a binder resin composition were stacked with the length direction of carbon fiber aligned at [+45°/0°/−45°/90°] to provide a four-layered laminate. Then, two such four-layered laminates were laminated symmetrically such that their 90-degree layers would face each other to obtain a laminate consisting of eight layers in total. The laminate obtained was placed on the surface of a flat mold made of aluminum and hermetically covered with bag material (a polyamide film) and a sealant. The cavity formed by the mold and the bag material was evacuated to form a vacuum, and the mold was then moved into a hot air dryer, heated up at a rate of 3° C./min from room temperature to a temperature of 90° C., and then heated at a temperature of 90° C. for 2 hours. Subsequently, while the vacuum state was kept in the cavity, the temperature was lowered to below 60° C. in atmospheric air, and then the cavity was opened to atmospheric air to provide a preform.

11. Measurement of Volume Proportion of Spacer Particles in Binder Resin Present in Preform Interlaminar Gaps The preform prepared was embedded in epoxy resin under conditions where dissolution of the binder resin would not occur and polished in the direction perpendicular to the carbon fibers contained in the two layers (90°-layer) sandwiching the central interlaminar gap, followed by photographing the cross section under an optical microscope at a magnification of 400 times. An interlaminar gap region between fiber layer regions was selected at random in the photograph and boundary lines were drawn between the fiber layer regions and the interlaminar gap region. The proportion of the area of the spacer particles to the total area of the binder resin composition present between the boundary lines was calculated to determine the volume proportion of the spacer particles. The same procedure was carried out for 100 randomly selected interlaminar gap regions, and the average was adopted.

12. Measurement of Interlaminar Gap Thickness in Preform

The preform prepared was cut from the direction perpendicular to the carbon fibers present in the central 90°-layer, and the cross section was polished and photographed under an optical microscope at a magnification of 400 times. For a randomly selected fiber interlaminar gap region in the photograph where the binder resin composition was present, boundary lines were drawn between the fiber layer regions and the interlaminar gap region and the distance between the boundary lines was measured as the interlaminar gap thickness. The same procedure was carried out for 100 randomly selected interlaminar gap regions, and the average was adopted.

13. Preparation of Fiber Reinforced Composite Material

The preform obtained was placed on the surface of a flat mold made of aluminum, and a polyester fabric treated to work as a peel ply and a knitted fabric made of polypropylene to work as a resin diffusion medium were placed thereon in this order. On top of them, a bag material and a sealant were attached to form a cavity that was hermetically sealed except for providing a resin inlet and a pressure-reducing suction port. The cavity was sucked by a vacuum pump through the pressure-reducing suction port to adjust the degree of vacuum to −90 kPa or less, and subsequently the mold and the preform were adjusted to a temperature of 70° C. For the temperature adjustment, a hot air dryer was used.

Elsewhere, the aforementioned base resin and curing agent for matrix resin production were mixed at a base resin/curing agent ratio of 100 parts to 41.9 parts to prepare a matrix resin. The matrix resin was preliminarily heated at a temperature of 70° C. for 30 minutes and subjected to vacuum degassing treatment.

The matrix resin subjected to preliminary heating and degassing treatment was set at the resin inlet of the mold, and the matrix resin was injected into the evacuated cavity by the pressure difference between the pressure in the cavity and the atmospheric pressure, thereby impregnating the preform. When the matrix resin reached the pressure-reducing suction port, the resin inlet was closed, and while the suction from the pressure-reducing suction port was continued, the state was held for 1 hour, followed by closing the pressure-reducing suction port.

Subsequently, the temperature was raised to cure the resin. Two different conditions were adopted as described below:

Molding condition 1: The temperature was raised to 140° C. at a rate of 1.5° C. per minute, followed by curing for 2 hours at the temperature of 140° C. The product was taken out from the mold and heated at a rate of 1.5° C./min up to a temperature of 180° C. in a hot air dryer, followed by curing for 2 hours at the temperature of 180° C. to provide a fiber reinforced composite material.

Molding condition 2: The temperature was raised to 180° C. at a rate of 1.5° C. per minute, followed by curing for 2 hours at the temperature of 180° C. to provide a fiber reinforced composite material.

Under either condition, the resulting fiber reinforced composite material had a fiber volume fraction Vf in the range of 55% to 60%.

14. Measurement of Interlaminar Gap Thickness in Fiber Reinforced Composite Material The fiber reinforced composite material prepared was cut from the direction perpendicular to the carbon fibers present in the central 90°-layer, and the cross section was polished and photographed under an optical microscope at a magnification of 400 times. For a randomly selected fiber interlaminar gap region in the photograph, boundary lines were drawn between the fiber layer regions and the interlaminar gap region and the distance between the boundary lines was adopted as the interlaminar gap thickness. The same procedure was carried out for 100 randomly selected interlaminar gap regions, and the average was adopted.

Of the 100 positions where interlaminar gap thickness measurements were taken, those where the thickness was less than 10 μm indicating that interlaminar gaps were substantially absent were counted to determine its proportion.

15. Evaluation for Voids in Fiber Reinforced Composite Material

A cross section of the resulting fiber reinforced composite material was observed and it was rated as good when it was substantially free of voids with a void fraction of less than 1%. The fiber reinforced composite material was rated as fair when the void fraction was 1% or more and less than 3% even if no unimpregnated portions were found in the outside appearance of the fiber reinforced composite material. The fiber reinforced composite material was rated as bad when unimpregnated portions were found in the outside appearance of the fiber reinforced composite material or the void fraction was 3% or more.

To determine the void fraction in fiber reinforced composite material, a cross section perpendicular to the reinforcement fiber layers in the fiber reinforced composite material is polished smoothly and the cross section is observed by an epi-illumination optical microscope at a magnification of 200 times, followed by calculating the proportion (%) of the area occupied by voids to the area of the observation field of view.

16. Measurement of Compression-after-Impact (CAI) Strength of Fiber Reinforced Composite Material From each fiber reinforced composite material sample obtained, a rectangular specimen with a length of 150 mm and a width of 100 mm was cut out with the length direction of the specimen aligned with the carbon fiber orientation angle of 0 degree, and a falling weight impact of 6.76 J per mm thickness of the specimen was applied at the center of the rectangular specimen according to JIS K 7089 (1996), followed by measuring the residual compression strength after applying an impact (CAI strength) according to JIS K 7089 (1996). The five samples were tested, and the average of the measurements was calculated.

Examples 1-7

Fiber reinforced composite material samples were produced as described above from base materials containing binder particles prepared as described above according to the compounding ratios given in Table 1. Each fiber reinforced composite material thus prepared was examined to determine its interlaminar gap thickness.

In Example 1, 25 parts by mass of liquid bisphenol type epoxy resin, 15 parts of aralkyl type epoxy resin, and 60 parts by mass of polyethersulfone as shown in Table 1 were dissolved uniformly to prepare binder resin, and after dispersing 40 parts by mass of Particle 1 (TR55) as spacer particles, processed into binder particles with an average particle diameter of 110 µm, which was then used to produce fiber reinforced composite material. The fiber reinforced composite material prepared from these binder particles served to realize adequately large uniform interlaminar gap thickness under varied molding conditions and gave a high CAI strength.

In Examples 2 to 7, binder particles and fiber reinforced composite material were prepared by carrying out the same procedure as in Example 1 except for using particle 2 (1002D), particle 3 (CX7323), particle 4 (SP-500), particle 5 (4000TF), particle 6 (pulverized TR-55 (1)), and particle 7 (pulverized TR-55 (2)), respectively, as spacer particles. Regardless of the type of binder particles used, all fiber reinforced composite material samples produced under molding conditions 1 and 2 were not largely different in terms of interlaminar gap thickness and had similar CAI values.

Examples 8 and 9

In Examples 8 and 9, binder particles and fiber reinforced composite material were prepared by carrying out the same procedure as in Example 1 except for using polyetherimide and phenoxy resin, respectively, as the thermoplastic resin soluble in epoxy resin. Regardless of the type of binder particles used, all fiber reinforced composite material samples produced under molding conditions 1 and 2 were not largely different in terms of interlaminar gap thickness and had similar CAI values.

Example 10

In Example 10, binder particles and fiber reinforced composite material were prepared by carrying out the same procedure as in Example 1 except for using 85 parts by mass of solid bisphenol type epoxy resin and 15 parts of aralkyl type epoxy resin as binder resin components and not adding thermoplastic resin soluble in epoxy resin. When this type of binder particles was used, the fiber reinforced composite material samples prepared under molding conditions 1 and 2 were not largely different in terms of interlaminar gap thickness and had similar CAI values.

Example 11

In Example 11, binder particles and fiber reinforced composite material were prepared by carrying out the same procedure as in Example 1 except for using cresol novolac type epoxy resin instead of aralkyl type epoxy resin as a binder resin component. When this type of binder particles was used, the fiber reinforced composite material samples prepared under molding conditions 1 and 2 were not largely different in terms of interlaminar gap thickness and had similar CAI values.

Example 12

In Example 12, binder particles and fiber reinforced composite material were prepared by carrying out the same procedure as in Example 1 except for replacing all epoxy resin components with liquid bisphenol type epoxy resin to serve as binder resin components. When this type of binder particles was used, the fiber reinforced composite material samples prepared under molding conditions 1 and 2 were not largely different in terms of interlaminar gap thickness and had similar CAI values.

Example 13

In Example 13, binder particles and fiber reinforced composite material were prepared by carrying out the same procedure as in Example 1 except that the spacer particles accounted for 10 parts by mass. When this type of binder particles was used, the fiber reinforced composite material samples prepared under molding conditions 1 and 2 were not largely different in terms of interlaminar gap thickness, although the interlaminar gap thickness was slightly smaller, and had similar CAI values.

Examples 14 and 15

In Examples 11 and 12, binder particles and fiber reinforced composite material were prepared by carrying out the same procedure as in Example 1 except for using binder particles with average particle diameters of 30 µm and 300

μm, respectively, produced from the same components as in Example 1. When these types of binder particles were used, the fiber reinforced composite material samples prepared under molding conditions 1 and 2 were not largely different in terms of interlaminar gap thickness and had similar CAI values.

Example 16

In Example 16, binder particles and fiber reinforced composite material were prepared by carrying out the same procedure as in Example 1 except for using a combination of 30 parts by mass of particle 1 (TR-55) and 10 parts by mass of particle 4 (SP-500) as spacer particles. When this type of binder particles was used, the fiber reinforced composite material samples prepared under molding conditions 1 and 2 were not largely different in terms of interlaminar gap thickness and had similar CAI values.

Comparative Example 1

In Comparative Example 1, binder particles and fiber reinforced composite material were prepared by carrying out the same procedure as in Example 1 except for not adding spacer particles. As a result of the absence of spacer particles in the binder particles, the sample prepared under molding condition 2 where the molding temperature was higher had a smaller interlaminar gap thickness and a largely lower CAI strength than the sample prepared under molding condition 1.

Comparative Example 2

In Comparative Example 2, binder particles and fiber reinforced composite material were prepared by carrying out the same procedure as in Example 1 except that the spacer particles accounted for 3 parts by mass. As a result of the lack of spacer particles in the binder particles, the sample prepared under molding condition 2 where the molding temperature was higher had a smaller interlaminar gap thickness and a largely lower CAI strength than the sample prepared under molding condition 1.

Comparative Example 3

In Comparative Example 3, binder particles and fiber reinforced composite material were prepared by carrying out the same procedure as in Example 1 except that the spacer particles accounted for 75 parts by mass. As a result of an excessive proportion of the spacer particles in the binder particles, the degree of impregnation with matrix resin decreased and the CAI strength was largely lower.

Comparative Example 4

In Comparative Example 4, epoxy resin to work as binder resin was not contained and only spacer particles were used in carrying out the same preform production procedure as in Example 1, but the preform layers failed to adhere to each other, making it impossible to produce a preform and fiber reinforced composite material.

TABLE 1

| | | | | Example 1 | Example 2 | Example 3 | Example 4 | Example 5 | Example 6 | Example 7 |
|---|---|---|---|---|---|---|---|---|---|---|
| Binder Resin | epoxy resin | cresol novolac-type epoxy resin | N-660 | | | | | | | |
| | | bisphenol type epoxy resin | jER825 | 25 | 25 | 25 | 25 | 25 | 25 | 25 |
| | | bisphenol type epoxy resin | jER1007 | | | | | | | |
| | | aralkyl type epoxy resin | NC-7300 | 15 | 15 | 15 | 15 | 15 | 15 | 15 |
| | thermoplastic resin soluble in epoxy resin | polyethersulfone | PES5200P | 60 | 60 | 60 | 60 | 60 | 60 | 60 |
| | | polyetherimide | Ultem 1010 | | | | | | | |
| | | phenoxy resin | YP-50 | | | | | | | |
| Spacer particles | polymer particles insoluble in epoxy resin | particle 1 (TR-55) | | 40 | | | | | | |
| | | particle 2 (1002D) | | | 40 | | | | | |
| | | particle 3 (CX7323) | | | | 40 | | | | |
| | | particle 4 (SP-500) | | | | | 40 | | | |
| | | particle 5 (4000TF) | | | | | | 40 | | |
| | | particle 6 (Pulverized TR-55 (1)) | | | | | | | 40 | |
| | | particle 7 (Pulverized TR-55 (2)) | | | | | | | | 40 |
| Physical properties of spacer particles | | average particle diameter [μm] | | 18 | 21 | 13 | 5 | 15 | 45 | 55 |
| | | sphericity [—] | | 85 | 78 | 97 | 96 | 91 | 65 | 76 |
| | | particle diameter distribution index [—] | | 1.5 | 1.9 | 1.2 | 1.1 | 1.5 | 3.2 | 2.4 |
| | | glass transition temperature [° C.] | | 160 | 53 | 140 | 55 | 265 | 167 | 167 |
| Physical properties of thermoplastic resin soluble in epoxy resin | | glass transition temperature [° C.] | | 230 | 230 | 230 | 230 | 230 | 230 | 230 |
| Physical properties of binder particles | | average particle diameter [μm] | | 110 | 110 | 110 | 110 | 110 | 110 | 110 |
| | | glass transition temperature [° C.] | | 82 | 82 | 82 | 82 | 82 | 82 | 82 |
| Features of preform | | volume fraction of spacer particles [%] | | 35 | 30 | 35 | 30 | 25 | 30 | 30 |
| | | content of spacer particles in interlayer gaps [g/m$^2$] | | 7 | 7 | 7 | 7 | 7 | 7 | 7 |
| | | preform interlayer gap thickness [μm] | | 80 | 90 | 65 | 80 | 75 | 100 | 100 |

TABLE 1-continued

| | | | | | | | |
|---|---|---|---|---|---|---|---|
| Characteristics of fiber reinforced composite material prepared under molding condition 1 primary curing: 140° C. × 2 hrs secondary curing: 180° C. × 2 hrs | interlayer gap thickness [μm] region with interlayer gap thickness of less than 10 μm [%] voids CAI [MPa] | 36 3 good 240 | 36 9 good 230 | 30 3 good 235 | 28 12 good 245 | 29 5 good 230 | 51 14 good 220 | 65 12 good 220 |
| Characteristics of fiber reinforced composite material prepared under molding condition 2 primary curing: 180° C. × 2 hrs | interlayer gap thickness [μm] region with interlayer gap thickness of less than 10 μm [%] voids CAI [MPa] | 34 5 good 240 | 32 10 good 225 | 30 4 good 235 | 24 13 fair 240 | 26 9 good 230 | 48 14 good 220 | 55 14 good 220 |

| | | | | Example 1 | Example 8 | Example 9 | Example 10 |
|---|---|---|---|---|---|---|---|
| Binder Resin | epoxy resin | cresol novolac-type epoxy resin | N-660 | | | | |
| | | bisphenol type epoxy resin | jER825 | 25 | 25 | 25 | |
| | | bisphenol type epoxy resin | jER1007 | | | | 85 |
| | | aralkyl type epoxy resin | NC-7300 | 15 | 15 | 15 | 15 |
| | thermoplastic resin soluble in epoxy resin | polyethersulfone | PES5200P | 60 | | | |
| | | polyetherimide | Ultem 1010 | | 60 | | |
| | | phenoxy resin | YP-50 | | | 60 | |
| Spacer particles | polymer particles insoluble in epoxy resin | particle 1 (TR-55) | | 40 | 40 | 40 | 40 |
| | | particle 2 (1002D) | | | | | |
| | | particle 3 (CX7323) | | | | | |
| | | particle 4 (SP-500) | | | | | |
| | | particle 5 (4000TF) | | | | | |
| | | particle 6 (Pulverized TR-55 (1)) | | | | | |
| | | particle 7 (Pulverized TR-55 (2)) | | | | | |
| Physical properties of spacer particles | average particle diameter [μm] | | | 18 | 18 | 18 | 18 |
| | sphericity [—] | | | 85 | 85 | 85 | 85 |
| | particle diameter distribution index [—] | | | 1.5 | 1.5 | 1.5 | 1.5 |
| | glass transition temperature [° C.] | | | 160 | 160 | 160 | 160 |
| Physical properties of thermoplastic resin soluble in epoxy resin | glass transition temperature [° C.] | | | 230 | 217 | 88 | — |
| Physical properties of binder particles | average particle diameter [μm] | | | 110 | 110 | 110 | 110 |
| | glass transition temperature [° C.] | | | 82 | 77 | 71 | 74 |
| Features of preform | volume fraction of spacer particles [%] | | | 35 | 30 | 30 | 30 |
| | content of spacer particles in interlayer gaps [g/m²] | | | 7 | 7 | 7 | 7 |
| | preform interlayer gap thickness [μm] | | | 80 | 70 | 70 | 65 |
| Characteristics of fiber reinforced composite material prepared under molding condition 1 primary curing: 140° C. × 2 hrs secondary curing: 180° C. × 2 hrs | interlayer gap thickness [μm] region with interlayer gap thickness of less than 10 μm [%] voids CAI [MPa] | | | 36 3 good 240 | 38 4 good 235 | 33 5 good 225 | 30 6 good 225 |
| Characteristics of fiber reinforced composite material prepared under molding condition 2 primary curing: 180° C. × 2 hrs | interlayer gap thickness [μm] region with interlayer gap thickness of less than 10 μm [%] voids CAI [MPa] | | | 34 5 good 240 | 36 5 good 235 | 30 7 good 225 | 24 11 good 220 |

| | | | | Example 1 | Example 11 | Example 12 | Example 13 | Example 14 | Example 15 | Example 16 |
|---|---|---|---|---|---|---|---|---|---|---|
| Binder Resin | epoxy resin | cresol novolac-type epoxy resin | N-660 | | 15 | | | | | |
| | | bisphenol type epoxy resin | jER825 | 25 | 25 | 40 | 25 | 25 | 25 | 25 |
| | | bisphenol type epoxy resin | jER1007 | | | | | | | |
| | | aralkyl type epoxy resin | NC-7300 | 15 | | | 15 | 15 | 15 | 15 |
| | thermoplastic resin soluble in epoxy resin | polyethersulfone | PES5200P | 60 | 60 | 60 | 60 | 60 | 60 | 60 |
| | | polyetherimide | Ultem 1010 | | | | | | | |
| | | phenoxy resin | YP-50 | | | | | | | |

TABLE 1-continued

| | | | | | | | | | | |
|---|---|---|---|---|---|---|---|---|---|---|
| Spacer particles | polymer particles insoluble in epoxy resin | particle 1 (TR-55) | 40 | 40 | 40 | 10 | 40 | 40 | 30 | |
| | | particle 2 (1002D) | | | | | | | | |
| | | particle 3 (CX7323) | | | | | | | | |
| | | particle 4 (SP-500) | | | | | | | | 10 |
| | | particle 5 (4000TF) | | | | | | | | |
| | | particle 6 (Pulverized TR-55 (1)) | | | | | | | | |
| | | particle 7 (Pulverized TR-55 (2)) | | | | | | | | |
| Physical properties of spacer particles | | average particle diameter [μm] | 18 | 18 | 18 | 18 | 18 | 18 | 18 | 5 |
| | | sphericity [—] | 85 | 85 | 85 | 85 | 85 | 85 | 85 | 96 |
| | | particle diameter distribution index [—] | 1.5 | 1.5 | 1.5 | 1.5 | 1.5 | 1.5 | 1.5 | 1.1 |
| | | glass transition temperature [° C.] | 160 | 160 | 160 | 160 | 160 | 160 | 160 | 55 |
| Physical properties of thermoplastic resin soluble in epoxy resin | | glass transition temperature [° C.] | 230 | 230 | 230 | 230 | 230 | 230 | 230 | |
| Physical properties of binder particles | | average particle diameter [μm] | 110 | 110 | 110 | 110 | 30 | 300 | 110 | |
| | | glass transition temperature [° C.] | 82 | 82 | 72 | 82 | 82 | 82 | 82 | |
| Features of preform | | volume fraction of spacer particles [%] | 35 | 30 | 30 | 15 | 40 | 30 | 35 | |
| | | content of spacer particles in interlayer gaps [g/m²] | 7 | 7 | 7 | 2 | 7 | 7 | 7 | |
| | | preform interlayer gap thickness [μm] | 80 | 80 | 65 | 75 | 50 | 120 | 85 | |
| Characteristics of fiber reinforced composite material prepared under molding condition 1 primary curing: 140° C. × 2 hrs secondary curing: 180° C. × 2 hrs | | interlayer gap thickness [μm] | 36 | 37 | 34 | 23 | 32 | 40 | 31 | |
| | | region with interlayer gap thickness of less than 10 μm [%] | 3 | 5 | 6 | 12 | 3 | 8 | 2 | |
| | | voids | good | good | good | good | good | good | good | |
| | | CAI [MPa] | 240 | 240 | 230 | 225 | 240 | 235 | 250 | |
| Characteristics of fiber reinforced composite material prepared under molding condition 2 primary curing: 180° C. × 2 hrs | | interlayer gap thickness [μm] | 34 | 34 | 32 | 21 | 31 | 36 | 31 | |
| | | region with interlayer gap thickness of less than 10 μm [%] | 5 | 6 | 7 | 14 | 4 | 15 | 4 | |
| | | voids | good | good | good | good | good | good | good | |
| | | CAI [MPa] | 240 | 240 | 225 | 220 | 240 | 230 | 250 | |

| | | | | Comparative Example 1 | Comparative Example 2 | Comparative Example 3 | Comparative Example 4 |
|---|---|---|---|---|---|---|---|
| Binder Resin | epoxy resin | cresol novolac-type epoxy resin | N-660 | 15 | 15 | 15 | |
| | | bisphenol type epoxy resin | jER825 | 25 | 25 | 25 | |
| | | bisphenol type epoxy resin | jER1007 | | | | |
| | | aralkyl type epoxy resin | NC-7300 | | | | |
| | thermoplastic resin soluble in epoxy resin | polyethersulfone | PES5200P | 60 | 60 | 60 | |
| | | polyetherimide | Ultem 1010 | | | | |
| | | phenoxy resin | YP-50 | | | | |
| Spacer particles | polymer particles insoluble in epoxy resin | particle 1 (TR-55) | | | 3 | 75 | 100 (particles only) |
| | | particle 2 (1002D) | | | | | |
| | | particle 3 (CX7323) | | | | | |
| | | particle 4 (SP-500) | | | | | |
| | | particle 5 (4000TF) | | | | | |
| | | particle 6 (Pulverized TR-55 (1)) | | | | | |
| | | particle 7 (Pulverized TR-55 (2)) | | | | | |
| Physical properties of spacer particles | | average particle diameter [μm] | | — | 18 | 18 | 18 |
| | | sphericity [—] | | — | 85 | 85 | 85 |
| | | particle diameter distribution index [—] | | — | 1.5 | 1.5 | 1.5 |
| | | glass transition temperature [° C.] | | — | 160 | 160 | 160 |
| Physical properties of thermoplastic resin soluble in epoxy resin | | glass transition temperature [° C.] | | 230 | 230 | 230 | — |
| Physical properties of binder particles | | average particle diameter [μm] | | 110 | 110 | 110 | — |
| | | glass transition temperature [° C.] | | 75 | 78 | 89 | — |
| Features of preform | | volume fraction of spacer particles [%] | | 0 | 5 | 85 | |
| | | content of spacer particles in interlayer gaps [g/m²] | | 0 | 1 | 11 | — |
| | | preform interlayer gap thickness [μm] | | 65 | 65 | 105 | — |
| Characteristics of fiber reinforced composite material prepared under molding condition 1 | | interlayer gap thickness [μm] | | 13 | 15 | 58 | — |
| | | region with interlayer gap thickness of less than 10 μm [%] | | 47 | 40 | 3 | — |
| | | voids | | fair | fair | bad | — |

TABLE 1-continued

| | | | | | |
|---|---|---|---|---|---|
| primary curing: 140° C. × 2 hrs secondary curing: 180° C. × 2 hrs | CAI [MPa] | 200 | 200 | 185 | — |
| Characteristics of fiber reinforced composite material prepared under molding condition 2 | interlayer gap thickness [μm] | 5 | 10 | 50 | — |
| | region with interlayer gap thickness of less than 10 μm [%] | 82 | 56 | 3 | — |
| | voids | fair | fair | bad | — |
| primary curing: 180° C. × 2 hrs | CAI [MPa] | 170 | 175 | 180 | — |

The invention claimed is:

1. A preform comprising a plurality of reinforcement fiber layers connected to each other by binder resin, the binder resin containing spacer particles insoluble in the binder resin, the spacer particles accounting for a volume proportion of 35% to 80% in the binder resin present in interlaminar gaps between the reinforcement fiber layers and a quantity of the binder resin present in the interlaminar gaps between reinforcement fiber layers is 0.5 to 50 g/m$^2$;

wherein the spacer particles are polymer particles having a glass transition temperature of 80° C. or more and comprise at least one resin compound selected from the group consisting of polyamide, polyamide-imide, polyimide, polycarbonate, polyphenylene sulfide, polyphenylene ether, polyether ether ketone, and copolymers thereof.

2. The preform as set forth in claim 1, wherein the spacer particles have a sphericity of 75 to 100 and a particle diameter distribution index of 1 to 5.

3. The preform as set forth in claim 1, wherein the spacer particles have an average particle diameter of 1 to 50 μm.

4. The preform as set forth in claim 1, wherein content of the spacer particles is 2 to 9 g/m$^2$ in each interlaminar gap between reinforcement fiber layers.

5. The preform as set forth in claim 1, wherein the binder resin contains thermosetting resin.

6. The preform as set forth in claim 5, wherein the thermosetting resin is epoxy resin.

7. The preform as set forth in claim 6, wherein solid epoxy resin is contained as the epoxy resin.

8. The preform as set forth in claim 6 comprising, as the epoxy resin, at least one epoxy resin compound selected from the group consisting of bisphenol type epoxy resin, novolac type epoxy resin, and aralkyl type epoxy resin.

9. The preform as set forth in claim 5, wherein the binder resin contains a thermoplastic resin soluble in the thermosetting resin contained in the binder resin.

10. The preform as set forth in claim 9, wherein the thermoplastic resin is at least one selected from the group consisting of polyethersulfone, polysulfone, polyetherimide, polyvinyl acetal, polymethyl methacrylate, and phenoxy resin.

11. The preform as set forth in claim 9, wherein the thermoplastic resin has a glass transition temperature of 150° C. or more.

12. A fiber reinforced composite material produced by impregnating the preform as set forth in claim 1 with matrix resin and curing the matrix resin.

13. The fiber reinforced composite material as set forth in claim 12, wherein an interlaminar gap thickness is 1 to 3 times as large as an average particle diameter of the spacer particles.

14. The fiber reinforced composite material as set forth in claim 12, wherein an interlaminar gap thickness is 1 to 150 μm.

15. A method of producing a fiber reinforced composite material comprising injecting matrix resin into the preform as set forth in claim 1 and curing the matrix resin, the binder resin being dissolved in the matrix resin during the step of injecting and curing the matrix resin while the spacer particles are not dissolved in the matrix resin and remain in interlaminar gaps, the thickness of the interlaminar gaps being 1 to 3 times as large as an average particle diameter of the spacer particles.

* * * * *